United States Patent Office 3,720,583
Patented Mar. 13, 1973

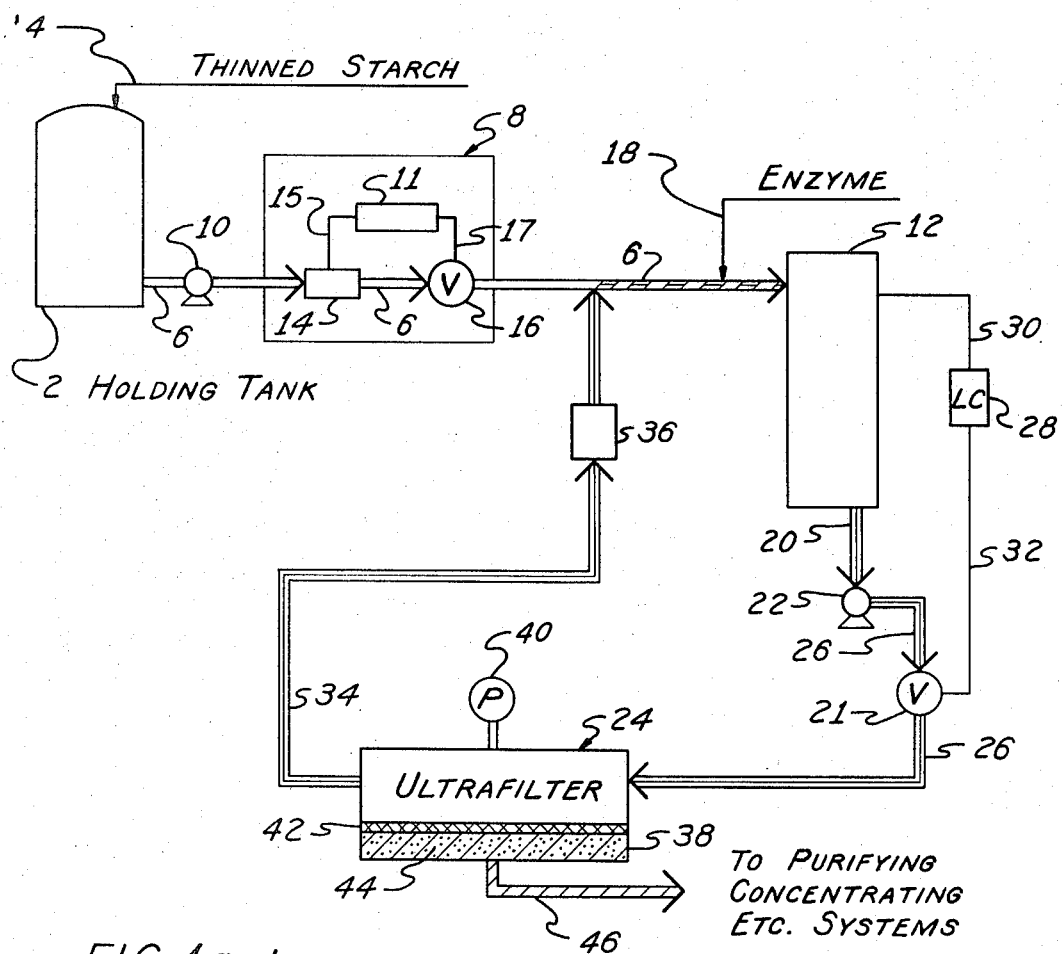

3,720,583
ENZYME HYDROLYSIS
Earl Eugene Fisher, Decatur, Ill., assignor to A. E.
Staley Manufacturing Company, Decatur, Ill.
Filed Dec. 20, 1968, Ser. No. 785,607
Int. Cl. C13k 1/06
U.S. Cl. 195—31 R                21 Claims

ABSTRACT OF THE DISCLOSURE

Process for continuously producing hydrolytic products whereby carbohydrates are hydrolyzed with enzymes under conditions which minimize enzyme inactivation and thereafter isolated and recovered by means of ultrafiltration.

DISCLOSURE OF THE INVENTION

This invention is directed to an apparatus and process for hydrolyzing carbohydrates and, more particularly, to a continuous process for hydrolyzing starch to dextrose or syrups containing dextrose with amylases whereby the amylases are recovered for subsequent hydrolytic action.

It is well known that carbohydrates can be hydrolyzed to low molecular weight saccharides with either a weak mineral acid or an enzyme. The existing preference for using enzymes, particularly in processes for producing saccharides, is quite evident as practically all commercial operations for producing dextrose from starch are presently using hydrolytic enzymes or are on the verge of converting over to their use.

Many of the advantages and reasons for using enzymes are presented in U.S. Pat. 2,305,168, the most significant being that enzymes provide a means for obtaining high yields of a specific product with little, if any, formation of byproducts. However the use of enzymes also presents certain problems, the most significant being that with present commercial enzymatic operations, the only effective way for terminating enzyme action, after the desired degree of enzymatic action has been achieved, is to denature or inactivate the enzyme. When this occurs, the activity of the enzyme is destroyed which prevents its use in subsequent hydrolytic actions. Since the irretrievable loss of enzyme activity increases substantially the cost of such operations, the use of enzymes is, by necessity, presently limited to those commercial operations in which relatively inexpensive enzymes can be used. Even in "continuous" type processes such as that disclosed in U.S. Pat. 3,332,414 and British Pat. 1,121,100, which disclose that a portion of the enzyme-starch hydrolyzate mixture is recycled, enzyme inactivation is required on the non-recycled portion when the saccharifying action has been completed.

Another problem is created during the step of enzyme inactivation. Normally inactivation is accomplished by applying heat or adding acid to the substrate containing the enzyme. Although this approach is effective, it is not entirely satisfactory as enzyme inactivation by heat or acid is generally accompanied by the formation of color bodies, reversionary products and other undesirable contaminants. Attempts to control or terminate enzyme action without deactivating or destroying the enzyme have met with little success. However even if these attempts were successful, no effective and economical method has been proposed for efficiently separating and recovering the enzyme in its active form. The problems therefore which confront enzymatic processes are twofold: (1) terminating or controlling enzyme activity, and (2) separating and recovering the enzyme in its active form.

It is therefore an object of this invention to provide an enzymatic process and apparatus for continuously producing saccharides.

Another object of this invention is to provide an economical process for isolating and recovering active enzymes from a product substrate.

A further object of this invention is to provide an enzymatic process and apparatus for hydrolyzing a carbohydrate substrate whereby the enzymes can be isolated and recovered from the substrate following hydrolysis for further hydrolytic action.

Another object of this invention is to provide an enzymatic process for producing saccharides whereby the enzymes are isolated and recovered from the saccharides in active form.

Still another object is to provide an apparatus and process for hydrolyzing starch whereby the hydrolytic products contain substantially less color bodies and reversionary products.

A further object of this invention is to provide an apparatus and process for producing dextrose or syrups containing dextrose on a continuous and economical basis.

Still another object is to provide an enzymatic process for producing dextrose which can be economically operated at conditions which are conducive to prolonging the activity of the enzyme.

Other objects of this invention will be apparent from the disclosure and drawing wherein FIG. 1 is a flow diagram illustrating and showing one embodiment of the process and apparatus of this invention.

In general, these and other objects are accomplished by saccharifying a carbohydrate substrate with enzyme catalyst and thereafter separating and recovering the saccharified products from the enzyme by subjecting the substrate under a hydraulic pressure gradient to a semi-permeable barrier having the capability of isolating and separating said saccharified products from the enzyme by permeation through the semi-permeable barrier and recovering that portion of the substrate containing the enzyme for use in subsequent saccharifying actions. With the above apparatus and process, starch, for example, can be continuously hydrolyzed to dextrose with enzymes over an extended period of time with substantially little or no reduction or loss in enzyme activity.

A better understanding of this invention can be obtained by referring to FIG. 1 which shows generally an apparatus designed specifically for continuously hydrolyzing starch with an enzyme such as glucoamylase by circulating in a closed path, a partially hydrolyzed starch substrate containing glucoamylase. In one zone of the above closed path the hydrolyzate-glucoamylase substrate mixture is subjected to a pressure gradient in contact with a semi-permeable membrane for separating a portion of the hydrolyzate that is substantially free of glucoamylase. In a second zone, that portion of the substrate containing the glucoamylase is maintained under conditions to further hydrolyze the substrate and to yield a half-life of at least 6 months. At a point between the first zone and second zone, additional partially hydrolyzed starch substrate is added in amounts equivalent to that portion of the substrate having passed through the barrier.

As in FIG. 1 more specifically shows, a thinned starch hydrolyzate prepared by partially hydrolyzing a granular starch with a mineral acid or enzyme or other means to a low D.E., preferably between about 18–25, is introduced into holding tank 2, through starch feed line 4. From tank 2 a constant amount of thinned starch hydrolyzate is pumped into reactor 12 through interconnecting line 6 by pumping means 10. Although the flow through line 6 into reactor 12 can be controlled by manually adjusting the pumping output of pumping means 10, it is preferred to rely on a fully automatic flow control system such as that shown generally by numeral 8. Flow control system 8 comprises three main elements, a flow measuring means 14 for measuring the actual flow in line 6, a flow sensing means 11 for determining the difference between the actual flow and the desired flow which has been preselected and set into the sensing means, and a throttle valve means 16 for automatically increasing or reducing the flow through line 6 on receipt of a signal from the sensing means.

With such a system, a preselected rate of flow from tank 2 to reactor 12 is set into sensing means 11. The actual flow through line 6 to reactor 12 is measured by flow measuring means 14. The measured flow rate is converted to an electrical or pneumatic signal and transmitted to sensing means 11 through line 15. The sensing means determines the variance, if any, of the actual flow with the preselected or desired flow. If a variance exists, a corrective signal is sent to valve means 16 through electrical or pneumatic line 17. Upon receipt of the signal, valve means 16 responds accordingly by either increasing or reducing the flow through line 6.

Prior to the partially thinned starch hydrolyzate entering reactor 12, a predetermined amount of saccharifying enzyme is introduced into line 6 and combined with the starch hydrolyzate through enzyme feed line 18. Reactor 12 is preferably of the type generally referred to as a continuous multi-stage reactor. However, any other type or design of reactor may be used as long as it is capable of providing a hold-up or retention time sufficient to obtain the desired degree of enzymatic saccharification under a predetermined set of reaction conditions.

After the desired degree of saccharification has been achieved, the hydrolyzate effluent exits reactor 12 through line 20 where it is pumped by pumping means 22 into ultrafilter 24 through interconnecting line 26. The rate at which the hydrolyzate effluent leaves reactor 12 and enters ultrafilter 24 is approximately the same as the rate at which the reactants (starch and enzyme) enters the reactor. When such a rate balance is achieved, the volume within the reactor will hold at a relatively constant level. To maintain this constant level, the flow through line 26 is varied by adjusting throttle valve 21. Although these adjustments can be made manually, they are preferably made automatically in response to a pneumatic or electronic signal received from level controlling means 28. The level controlling means receives a signal through line 30 indicating whether the level in the reactor is above or below a preselected point. This information is then transmitted through line 32 to throttle valve means 21. In response to this signal, valve means 21 responds by either increasing or reducing the flow into ultrafilter 24.

The flow from ultrafilter 24 through line 34 is less than the flow through valve 21; this lower flow is present and controlled by flow controller 36 which is essentially the same as flow controller 8 previously described. This reduced flow causes a hydraulic force or pressure to be exerted by the hydrolyzate on semi-permeable barrier 38 in ultrafilter 24. The resulting pressure is measured by hydraulic pressure gauge 40 positioned on ultrafilter 24. The amount of hydraulic force or pressure exerted is, therefore, dependent on the flow differential existing between valve 21 and flow controller 36. The resulting pressure creates a pressure drop or pressure gradient across semi-permeable barrier 38. When, for example, line 46 is at atmospheric pressure and the hydraulic force exerted on barrier 38 is 50 p.s.i., the pressure drop or pressure gradient across the barrier will be 50 p.s.i. Generally a hydraulic pressure gradient of at least 20 p.s.i. and preferably of at least 40 p.s.i. is sufficient to provide the necessary force for effective and efficient separation. As a general rule, the efficiency of separation increases as the hydraulic pressure gradient increases. The use of relatively high hydraulic pressure gradients is for the most part limited only by the capability of the membrane barrier to withstand such high pressures.

The pressurized effluent hydrolyzate entering ultrafilter 24 contains enzymes, products of the enzymatic action and possibly some unreacted partially thinned starch hydrolyzate. As the pressurized hydrolyzate enters the ultrafilter, a portion of the hydrolyzate comes in contact with semi-permeable barrier 38. Due to the diffusive and permeable characteristics of the barrier and because of the hydraulic pressure gradient being exerted on the barrier, a selected portion of the hydrolyzate (substantially free of enzymes) permeates through the barrier and into line 46. The remaining portion (that portion containing the active enzymes) is recycled to reactor 12 through lines 34 and 6. If additional processing of the product is desired, the product is directed from line 46 to other processing systems.

Semi-permeable barrier 38 comprises a microporous open celled sponge like material 44 covered by a thin layer of homogeneous, substantially non-porous polymer 42. The diffusive characteristics and properties of the barrier are such that specific materials are capable of diffusing through the barrier while others are retained.

The amount of product permeating through the semi-permeable barrier will vary depending primarily on the diffusive characteristics of the semi-permeable barrier and on the amount of hydraulic force exerted on the barrier. Generally, though, the amount permeating the diffusive barrier will be at least 30% and preferably at least 50% by volume of the hydrolyzate effluent entering the ultrafilter. That portion of the hydrolyzate which is being recycled will conversely be less than 70% and preferably less than 50% of the hydrolyzate's total volume.

The direction of flow and compositional make-up of materials entering and exiting reactor 12 are also depicted in FIG. 1. As is shown, the direction of flow in line 6 is from tank 2 to reactor 12. From tank 2 to that point in line 6 where lines 36 and 6 are joined, the material carried by line 6 is a partially thinned starch hydrolyzate (nonshaded arrow). From the point of junction of lines 6 and 36, the composition of line 6 is a mixture of recycled hydrolyzate effluent and partially thinned starch (partially shaded arrow). Lines 20 and 26 leading from reactor 12 to ultrafilter 24 carry the hydrolyzate effluent which primarily comprises saccharified products, partially hydrolyzed starch, enzymes, etc. (fully shaded arrow). A portion of the saccharified products present in the hydrolyzate effluent is removed by ultrafilter 24 and carried therefrom by line 46 to collection or to other processing systems (cross-hatched arrow). That portion of the hydrolyzate effluent remaining is recycled to reactor 12 through lines 34 (fully shaded arrow) and 6 (partially shaded arrow).

In a typical hydrolytic process for producing fermentable saccharides from starch, the effluent hydrolyzate entering the ultrafilter will contain approximately 50–98.0% fermentable saccharides and about 2–15% enzyme based on the weight of the total dry solids present in the effluent hydrolyzate. Generally, the hydrolyzate effluent being subjected to ultrafiltration as well as that portion permeating through the membrane barrier will have a dry solids content of at least 15% by weight and preferably a dry solids content of between 20 and 45% by weight.

In the application of the process and apparatus of this invention, a carbohydrate material such as granular starch is first treated in a manner such that it becomes pasted or water soluble. Preferably, the solubilization process will also include in addition to pasting, some hydrolyzation or "thinning" of the starch material. Hydrolyzing or thinning a starch material to a D.E. (dextrose equivalent) of between about 15 and 40% is highly desirable, as granular (non-thinned) starch is hydrolyzed very slowly by, for example, glucogenic enzymes. In addition, a partially thinned starch slurry possesses a substantially lower viscosity and a higher fluidity than a non-thinned starch slurry and can be handled much easier. In addition, this lower viscosity allows for the use of a more concentrated starch slurry during hydrolysis and also reduces subsequent evaporation cost of the hydrolyzed product. When a starch material is thinned to a D.E. of between about 25–35%, the hydrolyzation can be conducted at concentrations of starch as high as 35–50%.

Solubilization can be achieved by subjecting granular starch to heat or by contacting the granular starch with a mineral acid or a thinning enzyme such as alpha-amylase or by any combination of these.

Solubilization of starch by heating can be conveniently accomplished by the use of high temperature jet cookers, such as that disclosed in U.S. Pat. 3,101,284. According to this patent, a starch slurry can be solubilized at temperatures of 150° C. or higher and at pressures above atmospheric.

If a solubilizing or thinning enzyme such as alpha-amylase is used, solubilization can be readily accomplished on up to 45% starch solids at temperatures of about 65–85° C. and at a pH of between 5–7 over a period of one to 24 hours. Alpha-amylase can be obtained from organisms such as bacteria (e.g. *Bacillus subtilis*) or from other sources such as fungi (e.g. *Aspergillus niger*), barley malt and pancreas. During the thinning process, trace amounts of calcium ions may also be incorporated as an aid in activating and stabilizing alpha-amylse.

Finally, the starch can be solubilized by contacting an aqueous slurry of the starch with a mineral acid, such as hydrochloric or sulfuric, in amounts equivalent to about 0.05–0.20% acidity or higher based on the weight of the starch. Other types of acids, such as acetic acid, may also be used if desired. When solubilization has been obtained, the acid is neutralized with an alkaline material.

In applying the process and apparatus of this invention for producing dextrose, a partially thinned starch (obtained by one of the methods above described) is saccharified by contacting the solubilized starch with a glucogenic enzyme such as glucoamylase. Glucoamylase can be obtained from a number of different microorganisms, particularly of the Aspergillus, Clostridium, Mucor and Rhizopus genera in accordance with known methods such as those described in Liggett et al. 2,881,115 and Langlois et al. 2,893,921. Glucoamylase preparations in the form of filtered culture broths can be obtained from selected strains of *Aspergillus niger* according to the teachings of U.S. Pat. 2,557,078 and from selected strains of *Aspergillus phoenicis* according to U.S. Pats. 2,881,115 and 2,893,921.

Since glucoamylase preparations will also normally contain appreciable amounts of interfering enzymes, including transglucosidase (enzyme capable of polymerizing dextrose to non-fermentable polysaccharides), it is highly desirable, although not essential, to remove the interfering enzymes before the glucoamylase is used to saccharify starch to dextrose. There are several known procedures for refining glucoamylase so as to render it substantially free of interfering enzymes. Suitable refining procedures are described in U.S. Pats. 3,067,108 and 3,047,471 to Hurst et al. and in U.S. Pats. 2,967,804 and 2,970,086 to Kerr. The effect which transglucosidase has on the saccharification of starch with glucoamylase is reported in Cereal Chemistry, vol. 43, pages 658–669 (1966).

If the interfering enzymes are not removed prior to use, a substantially pure product can still be obtained by utilizing a semi-permeable barrier selective to the permeation of only the desired product. For example, if the desired product is dextrose, the membrane barrier would be one which rejects substantially all other saccharides with the exception of dextrose.

If desired, other enzymes can be used in combination with glucoamylase to further improve and increase dextrose yields or to obtain a mixture of fermentable saccharides such as dextrose and maltose. For example, the enzyme β-amylase, α-amylase and/or amylo-1,6-glucosidase can be used in various proportions. The enzyme amylo-1,6-glucosidase, quite often referred to as "pullulanase," is an enzyme capable of selectively hydrolyzing only alpha-1,6-glucosidic bonds of the amylopectin fraction of starch. Other enzymes capable of hydrolyzing alpha-1,6-glucosidic bonds are referred to in the literature as "iso-amylase" and "R enzyme."

The preparation of an enzyme exhibiting amylo-1,6-glucosidase activity was reported by Bender & Wallenfels in Biochemische Zeitschrift, vol. 334, pages 79–95 (1961). Other information convering the use and production of this enzyme can be found in Methods of Enzymology, vol. 8, pages 555–559 (1966). According to the above references, amylo-1,6-glucosidase can be readily obtained from the organism *Aerobacter aerogenes*. Certain strains of the organism, *Aerobacter aerogenes*, have been reported to be particularly good sources for obtaining this enzyme. For example, *Aerobacter aerogenes* (U–58), which is reported to be a direct descendant of the original strain isolated by Bender & Wallenfels, has been found to be a particularly good source of this enzyme. Various ultraviolet induced mutants of *Aerobacter aerogenes* (U–58) can also be used. Other reported strains of *Aerobacter aerogenes* which can be used include *Aerobacter aerogenes* ATCC 9621 and ATCC 15050.

Preparations of amylo-1,6-glucosidase or pullulanase can be obtained from the organism *Aerobacter aerogenes* by known cultivating methods. A suitable technique is described in the Bender & Wallenfels publication previously referred to. If desired, the crude preparation can be purified prior to use. However, the utility of the enzyme in the process of this invention is not restricted to preparations of any specific purity. Obviously, though, the use of an enzyme substantially free of contaminants would be advantageous.

If both glucoamylase and amylo-1,6-glucosidase are used in the saccharification process, either large or small amounts can be used. Since the enzymes are recoverable, as much of the enzyme as is practically and economically possible is normally used. In order that this invention provide a more economical as well as a more efficient process for saccharifying starch to dextrose, the amounts of enzyme used are preferably those amounts which are capable of producing the highest yields of dextrose at a minimum of cost. With the process of this invention, high yields of dextrose have been consistently obtained by using, for example, from about 50–1,500 or more units of glucoamylase per gram of starch dry solids and from 10–500 units of amylo-1,6-glucosidase per gram of dry solids. As a general rule, shorter reaction or contact times will be employed with an increased amount of enzyme. Generally, the amount of enzyme used will be that amount which will provide conversion times of between 0.1–12 hours and preferably between about 0.1 to 2.0 hours.

The potency or activity units of glucoamylase and amylo-1,6-glucosidase referred to above as well as in other sections of this disclosure are defined as follows:

One unit of glucoamylase is defined as that amount of enzyme which will convert 100 mg. of starch essentially to dextrose in 48 hours at 60° C. and pH 4.0. One unit of amylo-1,6-glucosidase is defined as that amount of enzyme present in 1.0 ml. of solution which, with excess pullulan as a substrate under standard conditions of assay, raises the reducing value within one hour at 45° C. to a value which is equivalent to 1 meg. of maltose.

Although this disclosure has, for the sake of brevity, been directed primarily to the enzymatic hydrolysis of starch to fermentable saccharides and particularly to dextrose, it is not intended that this invention be so limited. Other saccharides produced from other carbohydrate sources may also be used. For example, maltose, maltotriase and dextrins can be readily prepared by the hydrolytic action of alpha- and/or beta-amylase on starch. Likewise, xylose could be produced by the hydrolytic action of xylases on corn bran, soybean hulls, wheat hulls or other materials containing xylan. Also, galactose could be obtained from lactose; fructose from dextrose; invert sugars from sucrose; etc., by the use of appropriate enzymes.

It is also feasible that a combination of enzymes such as glucoamylase and isomerase could be used to produce fructose or combinations of dextrose and fructose directly from starch.

Specialty type corn syrups can also be produced. For example, syrup high in fermentable sugars but relatively low in dextrose may be readily produced by the process and apparatus of this invention. Such a syrup is described in U.S. Pat. 3,137,639. As can be seen from the above, many types of saccharified products are possible with the process and apparatus of this invention.

When the enzymatic action has been completed, the resulting substrate will contain predominantly the product of the enzymatic action and enzymes. However, other materials such as partially hydrolyzed carbohydrates and possibly other enzymatic by-products may be present in solution but to a substantially lesser degree. Prior to the apparatus and process of this invention, enzymes were separated from the products of reaction by first inactivating the enzyme to curtail further hydrolytic action then adsorbing the enzyme on activated charcoal. The charcoal and inactivated enzyme were separated and removed from the substrate by filtration. However, with the process of this invention, enzymes can be isolated and recovered from the substrate in active form and thus can be reused as often as they are recovered. As earlier mentioned, the concomitant isolation and separation of desired products and active enzymes from a solution is accomplished by subjecting a substrate containing both enzymes and products to a semi-permeable barrier under a hydraulic-pressure gradient.

Although the prior art discloses several methods for purifying or concentrating starch conversion products by means of dialysis membranes, none of the proposed techniques disclose the apparatus and process of this invention.

For example, U.S. Pat. 2,140,341 discloses a process for extracting sugars from colloidal dispersions using a dialysis membrane. U.S. Pat. 3,276,908 discloses a process for removing ash and protein from dextrose liquors using a dialysis membrane. Still another, U.S. Pat. 2,410,264 describes a method for concentrating starch conversion syrups using a semi-permeable dialysis membrane. The above patents in essence disclose methods for purifying or concentrating sugars by dialyzing a sugar solution against water. The application of a positive pressure to provide a pressure drop or pressure gradient (as opposed to a "water gradient") across a semi-permeable barrier for concomitantly isolating and recovering saccharified products and active enzymes is neither suggested nor contemplated.

Ultrafiltration is clearly distinguishable from dialysis or for that matter reverse osmosis. For purposes of this invention, ultrafiltration is defined as a process for separating solutes in a solvent whereby selected solutes are forced under a hydraulic-pressure gradient to flow through a semi-permeable membrane. There are basically two types of ultrafiltrations, diffusive ultrafiltration and microporous ultrafiltration. Diffusive ultrafiltration is a separation by ultrafiltration whereby a solvent and a solute are transported by molecular diffusion through an ostensibly homogeneous membrane under an activity gradient accelerated by the application of a hydraulic pressure differential. Microporous ultrafiltration, on the other hand, is a process whereby solutes having different molecular sizes are separated by passage through extremely small pores having an average size of between 500–5,000 A. Flow through the pores is accomplished by application of a hydraulic pressure gradient. Since microporous ultrafiltration more closely resembles a "filter" in the traditional sense, the cutoff level of the microporous filters is determined by the mean pore size of the membranous pores. However, with diffusive filters the rate and selectivity of solvent and solute permeability is said to be determined by the density of the polymer matrix and the dimensions of the diffusing molecule.

Of the two types of systems, the diffusive ultrafilter is preferred for use in the process and apparatus of this invention primarily because the diffusive ultrafilter contains no "pores" in the conventional sense and thus cannot be plugged by trapped solute molecules. This feature is of importance particularly when constant flow and retention properties are desired over a long term of operation.

As mentioned above, the diffusion ultrafilter is an ostensibly homogeneous gel barrier through which both solvents and solutes (depending on molecular size) are transported by molecular diffusion. This diffusive action occurs under the action of a concentration or activity gradient augmented by an increased hydraulic pressure differential which forces the solvent and solute through the membrane. Generally, permeability of the barrier is directly dependent upon the flexibility of the molecular chains making up the matrix. This means that the more highly expanded or hydrated the gel matrix becomes, the stronger is the specific binding affinity between the molecule and the matrix. Conversely, the tighter the gel matrix the weaker the affinity between solute and polymer thus lowering the solute's permeability. Thus, membranes prepared from highly hydrophilic polymers which swell to a limited extent in water have the potential for serving as useful diffusion aqueous ultrafiltration membranes. The rate and specificity of separation of one solute from another is affected, at least to some degree, by several factors including the hydraulic pressure gradient applied to the membrane, temperature and concentration of the solution, the hydrophilicity of the polymeric membrane, etc.

Diffusive ultrafilters which are presently available for commercial use and which are preferably used in the practice of this invention are the anisotropic type membrane filters having a molecular weight cutoff of about 75,000 or preferably about 50,000. An anisotropic filter is defined as a filter having an extremely thin (0.1–10 microns) layer of homogeneous polymer supported on a much thicker (20 microns–1 mm.) layer of microporous open celled material. Preferably, the open celled material is a polymeric sponge-like material. However other microporous materials such as metals, silicates, etc., may be used. The microporous material is used primarily to support the thinner membrane and to prevent film rupture at high pressures.

In accordance with this invention, the conditions which are preferably employed in saccharifying starch to dextrose are those which tend to maintain the stability of the enzyme without completely inhibiting enzyme activity. In other words, the saccharification of starch is conducted under conditions which are conducive to prolonging the activity of the enzyme over an extended period of time and, thus, enabling the enzyme to be used continuously over a period of several months to several years and, in some cases, even longer.

Factors which affect the stability and activity of the enzyme are many and varied. However, some of the more prominent are temperature, pH, substrate composition and substrate concentration. It is generally recognized that the activity of an enzyme will increase with an increase in substrate temperature. However, as the temperature is increased, the stability of the enzyme is normally drastically reduced. For example, at a temperature of 70° C., a pH of 4.0 and a solids content of about 20.0, glucoamylase has a half-life of only about 3 to 5 minutes. On the other hand, if the temperature is reduced to about 40° C., a pH of about 4 and a solids content of about 20.0, the half-life of glucoamylase is about three years. Although a reduction in temperature substantially increases the half-life of the enzyme, there is also a noticeable reduction in the activity of the enzyme.

In saccharification processes which do not have as one of their main objectives the recovery and reuse of the enzyme, there is little need in conducting the saccharification action under conditions which would provide for an enzyme half-life greater than that needed to achieve the desired degree of saccharification. As a result, conditions are employed which elicit the highest degree of enzyme activity rather than longest half-life. However with the apparatus and processes of this invention, emphasis is directed to enzyme half-life and reuse rather than enzyme activity. Therefore the amount of enzyme utilized during saccharification is not particularly critical if the half-life of the enzyme approaches three to five years. In some cases (depending on enzyme cost), a half-life of only six months to one year may be long enough to make the process commercially attractive. With glucoamylase, for example, a half-life of about 6 months can be realized by utilizing the enzyme at a temperature below 50° C. and a pH of below 5.0.

However if a half-life of three years or greater is desired, the saccharifying reaction should be conducted at a temperature of between 15–40° C. and preferably a temperature of between about 25–30° C. and a pH of between 3.0 and 5.0 and preferably between 3.7 and 4.3 depending, to some degree, on the source of enzyme. The dry substance content (D.S.) of the substrate to be hydrolyzed is maintained at a D.S. of below 50 and preferably at a D.S. of between 35–45.

The present invention is particularly adaptable to the production of saccharides from amylaceous materials. Most any type, variety, or purity of amylaceous materials can be used. For example, saccharides can be produced from cereal starch such as corn, rice, sorghum and wheat; root starch, such as potato and tapioca; waxy starch, such as waxy corn and waxy sorghum; high-amylose starch; separated starch fractions, i.e. amylose and amylopectin; crude or unrefined amylaceous materials such as steeped corn or wheat flour; and the like. Starches which have been modified as by oxidation, hydroxyalkylation or acid hydrolysis or mixtures or combinations of any of the above may also be used to advantage.

The following examples are merely illustrated embodiments of this invention and are not intended as specific limitations thereof.

EXAMPLE 1

To a conversion holding tank containing 1,000 ml. of a low (25–30) D.E. syrup having a dry solids content (D.S.) of 30%, 0.16 gm. of a highly purified glucoamylase (Diazyme L-30) were added. The enzyme was analyzed and was found to possess 100,000 units per gram of enzyme. The enzyme and syrup were stirred vigorously to insure complete mixing. Five ml. of glacial acetic acid was added to the syrup-enzyme mixture to adjust the mixture to a pH of 4–5. The above syrup-enzyme mixture was introduced under a pressure of 96–100 p.s.i. into a Diaflo ultrafiltration cell Model 401 equipped with a membrane barrier at a rate of about 460 ml. per hour. While still maintaining the system under a constant pressure, approximately 450 ml. per hour of the syrup-enzyme mixture was recycled to the hold tank. Approximately 10–12 ml. per hour of the hydrolyzed substrate diffused through the membrane barrier. The membrane used in the ultrafiltration cell was an Amicon diffusive ultrafiltration membrane UM-2 having a molecular weight cutoff of 1,000 and an area of 32 sq. cm. The cell was equipped with a magnetic stirrer positioned directly above the membrane which, when activated, maintained the mixture in constant agitation. The ultrafiltration system was operated continuously for a period of 120 hours, during which the effluent was analyzed periodically for its dextrose content. The results obtained are reported in Table I below.

TABLE I

| Sample number: | Time, hrs. | D.S. (dry solids) | D.E. (dextrose equivalent) | D. (dextrose) |
|---|---|---|---|---|
| 1 | 24 | 23.4 | 90.0 | 79.4 |
| 2 | 48 | 28.2 | 95.9 | 90.7 |
| 3 | 60 | 30.5 | 97.4 | 98.9 |
| 4 | 72 | 31.2 | 98.9 | 98.5 |
| 5 | 84 | 32.6 | 98.2 | 97.6 |
| 6 | 96 | 33.2 | 98.6 | 98.4 |
| 7 | 108 | 34.2 | 98.5 | 98.3 |
| 8 | 120 | 35.0 | 98.8 | 98.2 |

EXAMPLE 2

Ffty milliliters of a starch hydrolyzate having a dextrose (D) value of 90–95 and a dry solids (D.S.) content of about 30% were charged to an Amicon ultrafiltration cell Model 50. To the high dextrose starch hydrolyzate 17,400 units of Novo glucoamylase (Novo Industri, Copenhagen, Denmark) were added. The cell was equipped with a Diaflo ultrafiltration membrane XM-50 having an area of 11.6 sq. cm. and a molecular weight cutoff of 50,000. A 2.75 liter reservoir was filled with a mixture containing a partially thinned starch hydrolyzate having a dextrose equivalent (D.E.) of 20 and 0.1% sorbic acid (preservative) was connected with a nylon tube to the ultrafiltration cell. The high dextrose hydrolyzate in the ultrafiltration cell was adjusted to a pH of 3.8 with hydrochloric acid and the entire system (reservoir and ultrafiltration cell) was pressurized with air to a pressure of 50 p.s.i. The hydrolyzate in the cell was maintained at room temperature. As the reservoir became depleted an amount of fresh partially thinned substrate was added to refill the reservoir.

The product effluent recovered from the ultrafiltration cell was analyzed daily for its dextrose content. The results are reported in Table II below.

TABLE II

| Days of continuous operation: | pH | Temp., °C. | Percent dextrose based on dry solids |
|---|---|---|---|
| 5 | 4.5 | 23 | 93.2 |
| 13 | 4.4 | 23 | 93.8 |
| 19 | 4.0 | 23 | 94.0 |
| 28 | 4.0 | 23 | 94.4 |
| 34 | 4.2 | 23 | 93.7 |
| 43 | 3.6 | 23 | 94.8 |
| 50 | 4.2 | 23 | 93.2 |
| 62 | 4.8 | 23 | 92.8 |
| 68 | 4.8 | 23 | 93.8 |
| 76 | 5.0 | 23 | 92.8 |
| 82 | 5.4 | 23 | 93.0 |
| 89 | 4.4 | 23 | 93.2 |
| 97 | 4.1 | 23 | 93.8 |
| 109 | 4.2 | 23 | 92.4 |

Upon completing the above runs, the substrate was analyzed for enzyme activity and was found to contain substantially the degree of enzyme activity as was initially added. Analysis of the product also indicated that the product contained very little, if any, color bodies or reversionary products.

EXAMPLE 3

The process described in Example 2 was repeated with the exception that an enzyme system comprising 13.8 gms. of glucoamylase, Novo glucoamylase 75 (4700 μ/g.) and 6.0 gms. of amylo-1,6-glucosidase (2676 μ/g.) was substituted for the glucoamylase originally used. The substrate was maintained at a pH of 5.8 and a temperature of about 23–25° C. The results reported in Table III show that continuously high yields can be obtained with the process of this invention by utilizing selected enzyme systems.

TABLE III

| Sample number: | Time, (days) | D.S. (dry solids) | D.E. (dextrose equivalent) | D. (dextrose) |
|---|---|---|---|---|
| 1 | 1 | 33.7 | 98.2 | 97.2 |
| 2 | 9 | 33.3 | 98.0 | 97.0 |
| 3 | 15 | 33.3 | 98.8 | 97.5 |
| 4 | 17 | 33.3 | 98.2 | 98.0 |
| 5 | 27 | 33.3 | 97.8 | 97.1 |
| 6 | 48 | 33.3 | 97.7 | 96.6 |
| 7 | 64 | 33.5 | 97.4 | 96.6 |
| 8 | 74 | 32.7 | 96.6 | 97.0 |
| 9 | 93 | 32.1 | 97.3 | 97.2 |
| 10 | 103 | 32.5 | 97.1 | 96.3 |
| 11 | 121 | 32.4 | 97.3 | 96.0 |
| 12 | 129 | 32.4 | 97.6 | 96.4 |
| 13 | 147 | 34.1 | 96.8 | 96.5 |
| 14 | 158 | 32.6 | 98.2 | 96.4 |
| 15 | 177 | 32.0 | 97.0 | 96.4 |

Since many embodiments of this invention may be made and since many changes may be made in the embodiments described, the foregoing is interpreted as illustrative and the invention is defined by the claims appended hereafter.

What is claimed is:

1. A continuous process for producing a saccharide in an aqueous reaction mixture containing a carbohydrate and an active enzyme which comprises continuously: hydrolyzing the carbohydrate with the active enzyme to produce a saccharide; subjecting the aqueous reaction mixture containing the residue of the carbohydrate, the saccharide and the active enzyme to permeation under a pressure gradient to effect passage of at least a substantial portion of the saccharide through a semi-permeable barrier while retaining the active enzyme and the residue of carbohydrate in the aqueous reaction mixture, said passed saccharide being substantially free of active enzyme; collecting the passed saccharide; and retaining the active enzyme.

2. The process of claim 1 wherein the carbohydrate is derived from a starch-containing material.

3. The process of claim 2 wherein the permeation is ultrafiltration and is conducted under a pressure gradient of greater than 20 p.s.i.

4. The process of claim 2 wherein the retained active enzyme is an amylase.

5. The process of claim 4 wherein the amylase is selected from the group consisting of α-amylase, β-amylase, glucoamylase, amyl-1,6-glucosidase and combinations thereof.

6. The process of claim 2 wherein the saccharide is predominantly dextrose.

7. The process of claim 2 wherein the saccharide is fermentable.

8. A continuous process for producing dextrose in an aqueous reaction mixture containing an amylaceous material and an active enzyme exhibiting glucogenic activity which comprises continuously: hydrolyzing the amylaceous material with the active enzyme under conditions to produce dextrose and minimize enzyme inactivation; subjecting the aqueous reaction mixture containing the residue of the amylaceous material, the dextrose and the active enzyme to ultrafiltration under a pressure gradient to effect passage of at least a substantial portion of the dextrose through an ultrafiltration membrane while retaining the active enzyme and the residue of the amylaceous material in the aqueous reaction mixture, said passed dextrose being substantially free of active enzyme; collecting the passed dextrose; and retaining the active enzyme for use in a subsequent enzymatic action.

9. The process of claim 8 wherein the amylaceous material is a partially thinned starch hydrolyzate having a D.E. of between about 15 to 40%.

10. The process of claim 9 wherein the reaction mixture being subjected to ultrafiltration has a dry solids content of at least 15% by weight.

11. The process of claim 10 wherein the enzyme comprises glucoamylase.

12. The process of claim 10 wherein the enzyme comprises glucoamylase ad amylo-1,6-glucosidase.

13. The process of claim 8 wherein the hydrolysis is conducted under conditions which will provide an enzyme half-life of at least six months.

14. The process of claim 8 wherein the portion of reaction mixture containing the active enzyme comprises less than 70% of the total reaction mixture by volume.

15. In the method of hydrolyzing a carbohydrate to a saccharide in the presence of an active enzyme, the improvement comprising circulating in a closed path a partially hydrolyzed reaction mixture containing the carbohydrate, the saccharide and the enzyme; in one zone in said path subjecting the reaction mixture to a pressure gradient in contact with a semi-permeable membrane to pass through said membrane a portion of the reaction mixture containing saccharide of the passed saccharide being substantially free of the active enzyme; collecting the saccharide; in another zone in said path maintaining the reaction mixture under conditions to hydrolyze the reaction mixture and to yield an enzyme half-life of at least six months; and between said one zone and said other zone, adding partially hydrolyzed carbohydrate equivalent to said portion of the reaction mixture containing the saccharide passed through said membrane.

16. The process of claim 15 wherein the carbohydrate is derived from a starch-containing material.

17. The process of claim 16 wherein the permeation ultrafiltration and is conducted under a pressure gradient of greater than 20 p.s.i.

18. The process of claim 16 wherein the retained active enzyme is an amylase.

19. The process of claim 18 wherein the amylase is selected from the group consisting of α-amylase, β-amylase, glucoamylase, amylo-1,6-glucosidase and combinations thereof.

20. The process of claim 16 wherein the saccharide is dextrose.

21. The process of claim 16 wherein the saccharide is fermentable.

References Cited

UNITED STATES PATENTS

| 2,891,869 | 6/1959 | Langlois | 195—31 |
| 3,085,687 | 4/1963 | Erbach | 210—195, 321 |
| 3,186,917 | 6/1965 | Gerhardt et al. | 195—1 |
| 3,228,876 | 1/1966 | Mahon | 210—22 |
| 3,472,765 | 10/1969 | Budd et al. | 195—115 |
| 3,337,414 | 8/1967 | Wilson | 195—31 |

OTHER REFERENCES

Michaels: "Ultrafiltration," March 1968.

Michaels: "New Separation Technique," Chem. Eng. Progress, vol. 64, No. 12, December 1968.

Pazur, J. H.: Starch: Chem. and Tech., vol. 1, 1965.

A. LOUIS MONACELL, Primary Examiner

G. M. NATH, Assistant Examiner

U.S. Cl. X.R.

195—115, 134